United States Patent [19]

Wright et al.

[11] 3,856,825

[45] Dec. 24, 1974

[54] 3-DIETHYLAMINO-2,2-DIMETHYLPROPYL 5-(SUBSTITUTED PHENYL)-2-FUROATES

[75] Inventors: George C. Wright; Homer A. Burch; Marvin M. Goldenberg, all of Norwich, N.Y.

[73] Assignee: Morton-Norwich Products, Inc., Norwich, N.Y.

[22] Filed: Nov. 2, 1973

[21] Appl. No.: 412,264

[52] U.S. Cl............. 260/347.5, 424/285, 260/347.5
[51] Int. Cl.............................................. C07d 5/26
[58] Field of Search................................. 260/347.5

[56] References Cited
OTHER PUBLICATIONS

Chemical Abstracts, Seventh Collective Index, (Vols. 56–65), pages 9752 S to 9756 S (1969).

Chemical Abstracts, Vol. 66, abst. No. 84,599a, (1967), (abst. of Nazaretyan et al.).

Mndzhoyan et al., (I) C. A. Vol. 59, (1963), p. 13915 to 13916.

Mndzhoyan et al., (II) C. A. Vol. 60, 1964, p. 997e.

Tsukervanik et al., C. A. Vol. 59, 1963, p. 6341a & 6341b.

Wang et al., C. A. Vol. 66, 1967, p. 377072.

*Primary Examiner*—John D. Randolph
*Attorney, Agent, or Firm*—Anthony J. Franze

[57] ABSTRACT

The titled compounds are useful antispasmodics.

11 Claims, No Drawings

3-DIETHYLAMINO-2,2-DIMETHYLPROPYL 5-(SUBSTITUTED PHENYL)-2-FUROATES

This invention relates to a series of 3-diethylamino-2,2-dimethylpropyl 5-(substituted phenyl)-2-furoates of the formula:

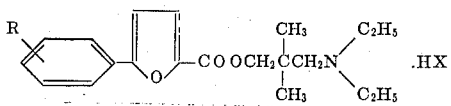

wherein R is a member of the group consisting of 4-nitro, 4-trifluoromethyl, 3,4-difluoro, 3-methoxy, 4-methyl, 4-methoxy, 4-bromo, 2,3-dichloro, 2-nitro-4-methyl, and 4-chloro; and HX is hydrochloride or fumarate. These compounds possess pharmacologic properties particularly being useful as antispasmodics. They are capable in doses of from 1–10 mcg/ml of inhibiting contractile responses of the isolated rabbit ileum to transmural electrical stimulation and upon intravenous administration in suitable physiologic menstrua such as isotonic saline to dogs antagonize the atropine-resistant contractions of the colon to intermittent pelvic nerve stimulation.

The method which is currently preferred for the preparation of these compounds consists in reacting a 5-(substituted phenyl)-2-furoyl chloride with 3-diethylamino-2,2-dimethylpropanol. The products obtained are in the form of their salts and may be readily converted to the base and other salts.

In order that this invention may be readily available to and understood by those skilled in the art the following examples are supplied.

EXAMPLE I

3-Diethylamino-2,2-dimethylpropyl 5-(p-Nitrophenyl)-2-furoate Hydrochloride

A 55 g (0.24 mole) portion of 5-(p-nitrophenyl)-2-furoic acid was added with rapid stirring to 84 ml of thionyl chloride at room temperature. The reaction mixture was heated until solution occurred (about 45 min), refluxed for 0.5 hr, cooled and stripped of excess thionyl chloride under reduced pressure. The residue was treated with a solution of 38.5 g (0.24 mole) of 3-diethylamino-2,2-dimethylpropanol in 1,300 ml of dry benzene. The resulting solution was refluxed for 3 hr. cooled, diluted with 750 ml. of petroleum ether and allowed to stand at room temperature overnight. The benzene-petroleum ether solution was treated with 4 ml. of concentrated HCl, allowed to stir 0.5 hr. and adjusted to pH 8 with 200 ml. of saturated aqueous $Na_2CO_3$. Extraction of the aqueous phase was carried out with 2,300 ml. of benzene in portions. The benzene extracts were dried over $MgSO_4$ overnight and filtered. The filtrate was treated with ether-HCl to pH 3, diluted with 800 ml of petroleum ether, allowed to stand 1 hr. and filtered. The tan solid was washed with petroleum ether and dried; m.p. 138°–141°; yield 60 g (61%).

The product was recrystallized from 325 ml. of alcohol; m.p. 179°–182°; yield 44 g (45%).

Anal. Calc. for $C_{20}H_{28}N_2O_5$.HCl: C, 58.46; H, 6.62; N, 6.82.
Found: C, 58.45; H, 6.78; N, 6.87.

EXAMPLE II

3-Dimethylamino-2,2-dimethylpropyl 5-(p-Trifluoromethyphenyl)-2-furoate Hydrochloride A. A mixture of p-aminobenzotrifluoride (50 g, 0.31 mole), $H_2O$ (31 ml.), and concentrated HCl (84 ml.) was diazotized by dropwise addition of a solution of $NaNo_2$ (23 g, 0.33 mole) in $H_2O$ (62 ml.), with the pot temperature kept below 10° (cooled with an ice bath). The mixture was stirred for 30 minutes and furfural (38 g. 0.40 mole) in $H_2O$ (62 ml) was added, followed by a solution of $CuCl_2$ (14 g) in $H_2O$ (62 ml). The stirred mixture was heated at 50°–60° for 4 hr. then stirred at room temperature for 2 hr. and stored overnight at room temperature. The aqueous portion of the reaction mixture was decanted, and the residue was dissolved in $CHCl_3$ (600 ml) and stored overnight over $MgSO_4$ and Darco. The mixture was filtered and the filtrate stripped of solvent under reduced pressure, yield: 45 g (60%).

B. A solution of $AgNO_3$ (70 g, 0.43 mole) in $H_2O$ (140 ml) was added to a solution of NaOH (33 g, 0.81 mole) in $H_2O$ (120 ml) with stirring. The resulting brown, semi-solid mixture was added to 5-(p-trifluoromethylphenyl)-2-furaldehyde (45 g, 0.19 mole) and the mixture was stirred for 45 minutes. The mixture was filtered, the filtrate was cooled in an ice bath and the solution was adjusted to pH 2 with conc. HCl. The product was collected by filtration and recrystallized from benzene; m.p. 180°–183°, yield 7.5 g (20%).

Anal. Calc. for $C_{12}H_7F_3O_3$: C, 56.26; H, 2.75.
Found: C, 55.92; H, 2.80.

C. 5-(p-Trifluoromethylphenyl)-2-furoic acid (9.5 g, 0.037 mole) was added with rapid stirring to thionyl chloride (20 ml) and refluxed for 3 hr. The mixture was stripped of excess thionyl chloride under reduced pressure, benzene (50 ml) was added, and the mixture was again stripped of solvent. The residue was treated with a solution of 3-diethylamino-2,2-dimethylpropanol (5.9 g, 0.037 mole) in benzene (200 ml), refluxed for 3 hr. cooled, diluted with petroleum ether (200 ml) and stored overnight at room temperature. The product was collected by filtration and recrystallized from ethyl acetate (500 ml), yield: 10.5 g. (65%). A sample was recrystallized from ethyl acetate, m.p. 162°–164°.

Anal. Calc. for $C_{21}H_{26}F_3NO_2$.HCl: C, 58.07; H, 6.22; N, 3.23.
Found: C, 58.23; H, 6.50; N, 3.15.

EXAMPLE III

3-Diethylamino-2,22-dimethylpropyl 5-(3, 4-Difluorophenyl)-2-furoate Hydrochloride Hemihydrate A. A mixture of 3,4-difluoroaniline (65 g, 0.50 mole) in $H_2O$ (300 ml) and concentrated HCl (200 ml) was diazotized by dropwise addition of $NaNO_2$ (34 g, 0.50 mole) in $H_2O$ (200 ml), with the pot temperature kept below 7°. Thirty minutes after completing the addition, furfural (48 g, 0.50 mole) was added followed by a solution of $CuCl_2.2H_2O$ (10 g) in $H_2O$ (100 ml). The mixture was stirred for 6 hr at ambient temperature and then stored overnight at room temperature. The aqueous solution was decanted, the residue dissolved in ether (1200 ml) and stored over $MgSO_4$ and Darco overnight. The mixture was filtered and the filtrate was stripped of solvent under reduced pressure. The residue was recrystallized from cyclohexane (1000 ml), yield: 42 g (40%). A sample was recrystallized from cyclohexane, m.p. 84°–87°.

Anal. Calc. for $C_{11}H_6F_2O_2$: C, 63.47; H, 2.91.
Found : C, 63.57; H, 3.03.

B. A solution of $AgNO_3$ (69 g, 0.4 mole) in $H_2O$ (140 ml) was added to a solution of NaOH (32 g, 0.8 mole) in $H_2O$ (120 ml) with stirring. 5-(3,4-Difluorophenyl)-2-furaldehyde (41.5 g, 0.20 mole) was added to the resulting brown, semi-solid mixture and then stirred for 1 hr. The mixture was filtered and the filtrate was adjusted to pH 2 with 20% HCl. The product was collected by filtration and air dried, yield: 21 g (47%); a sample was recrystallized vrom benzene, m.p. 212°–214°.

Anal. Calc. for $C_{11}H_6F_2O_3$: C, 58.94; H, 2.70.
Found : C, 58.55; H, 2.76.

C. 5-(3,4-Difluorophenyl)-2-furoic acid (20 g, 0.09 mole) was added to thionyl chloride (35 ml) and the mixture was refluxed for 3 hr. The mixture was stripped of excess thionyl chloride under reduced pressure, benzene (100 ml) was added, and the mixture was again stripped of solvent. The residue was dissolved in benzene (200 ml) and a solution of 3-diethylamino-2,2-dimethylpropanol (14.3 g, 0.09 mole) in benzene (200 ml) was added. The mixture was refluxed for 3 hr, cooled, diluted with petroleum ether (50 ml) and stored overnight at room temperature. The benzenepetroleum ether solution was decanted, the residue was dissolved in $H_2O$ (500 ml) adjusted to pH 8 with saturated, aqueous $K_2CO_3$, and the product was extracted with ether (600 ml). The extract was dried overnight over $MgSO_4$ and Darco, filtered, and the filtrate adjusted to pH 2 with a solution of dry HCl in ether. The product oiled out of solution and crystallized with scratching. The product was recrystallized from ethyl acetate-acetone (5:1), yield: 17 g (47%). A sample was recrystallized twice from ethyl acetate-acetone (5:1), m.p. 133°–135°.

Anal. Calc. for $C_{20}H_{25}F_2NO_3 \cdot HCl$: C, 58.45; H, 6.62; N, 3.41.
Found : C, 58.43; H, 6.74; N, 3.49.

EXAMPLE IV

3-Diethylamino-2,2-dimethylpropyl 5-(m-Methoxyphenyl)-2-furoate Fumarate

A. A mixture of m-anisidine (248 g, 2.0 mole) in $H_2O$ (200 ml) and conc. HCl (540 ml) was diazotized by dropwise addition of $NaNO_2$ (144 g, 2.08 mole) in $H_2O$ (400 ml), with the pot temperature kept below 10° (cooled with an ice bath). Thirty minutes after completing the addition, furfural (369 g, 3.0 mole) in $H_2O$ (400 ml) was added, followed by $CuCl_2 \cdot 2H_2O$ (92 g) in $H_2O$ (400 ml). The mixture was heated to 50°, the water bath was removed and the mixture was stirred for 4 hr with the temperature slowly returning to 25°. The solution was decanted and extracted with $CHCl_3$ (1,000 ml) in portions. The residue was dissolved in $CHCl_3$ (3000 ml), combined with the extract from the aqueous phase and the solution was stored overnight over $MgSO_4$ and Darco. The mixture was filtered and the filtrate stripped of solvent yielding 37 g (9.2%) of 5-(m-methoxyphenyl)-2-furaldehyde.

B. A solution of $AgNO_3$ (70 g, 0.43 mole) in $H_2O$ (140 ml) was added to a solution of NaOH (32.5 g, 0.81 mole) in $H_2O$ (120 ml) with stirring. The resulting brown, semi-solid mixture was added to 5-(m-methoxyphenyl)-2-furaldehyde (37 g, 0.18 mole) and the mixture was stirred for 1 hr. The mixture was filtered and the filtrate was washed with ether (500 ml). The aqueous phase was cooled in an ice bath, adjusted to pH 2 with conc. HCl, and the product was collected by filtration. The product was recrystallized from acetone; m.p. 163°–166°, yield: 10 g (25%).

Anal. Calc. for $C_{12}H_{10}O_4$: C, 66.05; H, 4.62.
Found : C, 65.93; H, 4.67.

C. 5-(m-Methoxyphenyl)-2-furoic acid (16.3 g, 0.075 mole) was added with rapid stirring to thionyl chloride (40 ml) and refluxed for 3 hr. The mixture was stripped of excess thionyl chloride under reduced pressure, benzene (100 ml) was added, and the mixture was again stripped of solvent. The residue was treated with a solution of 3-diethylamino-2,2-dimethylpropanol (12 g, 0.075 mole) in benzene (300 ml), refluxed for 3 hours, cooled, diluted with petroleum ether (300 ml), and stored overnight at room temperature. The benzene-petroleum ether solution was decanted, the residue dissolved in $H_2O$ (700 ml), and the solution adjusted to pH 10 with saturated aqueous $K_2CO_3$ (30 ml). The product was extracted from the aqueous phase with benzene (700 ml) in portions and the extract dried overnight over $MgSO_4$ and Darco. The mixture was filtered and the filtrate was stripped of solvent under reduced pressure. The residue (21 g, 0.06 mole) in isopropanol (200 ml) was treated with a solution of fumaric acid (7 g, 0.06 mole) in isopropanol (100 ml) and the mixture was cooled overnight. The product was collected by filtration, yield: 18.5 g (52%). A sample was recrystallized from absolute ethanol, m.p. 138°–140°.

Anal. Calc. for $C_{21}H_{29}NO_4 \cdot C_4H_4O_4$: C, 63.14; H, 6.99; N, 2.95.
Found: C, 63.17; H, 7.14; N, 3.01.

EXAMPLE V

3-Diethylamino-2,2-dimethylpropyl 5-(p-Methylphenyl)-2-furoate Fumarate

A. p-Toluidine (216 g, 2.0 mole) in $H_2O$ (400 ml) and concentrated HCl (540 ml) was diazotized by dropwise addition of a solution of $NaNO_2$ (144 g, 2.08 mole) in $H_2O$ (400 ml), with the pot temperature kept below 10°. Thirty minutes after completing the addition, furfural (246 g, 2.56 mole) was added followed by a solution of $CuCl_2.2H_2O$ (92 g) in $H_2O$ (400 ml). The stirred mixture was heated at 50°–60° for 4 hr, the water bath was removed, the mixture was stirred for 2 hr and then stored overnight at room temperature. The mixture was extracted with ether (2 g) in portions and the extract stored overnight over $MgSO_4$ and Darco. The mixture was filtered and the filtrate stripped of solvent under reduced pressure (water bath heated to 90°–95° to remove excess furfural). The product was extracted from the black oily residue with hot petroleum ether. The solvent was removed under reduced pressure leaving a brown oily residue, yield: 100 g.

B. A solution of $AgNO_3$ (138 g, 0.81 mole) in $H_2O$ (400 ml) was added to a solution of NaOH (65 g, 1.62 mole) in $H_2O$ (200 ml) with stirring. The resultant brown, semi-solid mixture was added to 5-(p-Methylphenyl)-2-furaldehyde (100 g, 0.54 mole) and then stirred for 20 min. The mixture was filtered and the filtrate was adjusted to pH 2 with aqueous 20% HCl. The product was collected by filtration and air dried, yield: 19 g (17%).

C. 5-(p-Methylphenyl)-2-furoic acid (19 g, 0.095 mole) was added to thionyl chloride (35 ml) with rapid stirring and then the mixture was refluxed for 3 ½ hr. The reaction mixture was stripped of excess thionyl chloride under reduced pressure, benzene (100 ml) was added, and the mixture was again stripped of solvent. The residue was dissolved in benzene (300 ml) and a solution of 3-diethylamino-2,2-dimethylpropanol (15.1 g, 0.095 mole) in benzene (200 ml) was added. The mixture was refluxed for 3 hr., cooled, diluted with petroleum ether (500 ml) and stored overnight at room temperature. The benzene-petroleum ether solution was decanted, the residue dissolved in $H_2O$ (500 ml) and the solution adjusted to pH 8 with saturated aqueous $K_2CO_3$. The product was extracted from the aqueous phase with ether (600 ml) in portions and the extract was dried overnight over $MgSO_4$ and Darco. The mixture was filtered and the filtrate was stripped of solvent under reduced pressure. The residue (20 g) in isopropanol (150 ml) was added to a solution of fumaric acid (7 g) in isopropanol (250 ml). The product was collected by filtration and recrystallized from isopropanol; m.p. 135°–137°, yield: 17 g (39%).

Anal. Calc. for $C_{21}H_{29}NO_3.C_4H_4O_4$: C, 65.34; H, 7.24; N, 3.05.
Found: C, 65.36; H, 7.32; N, 3.00.

EXAMPLE VI

3-Diethylamino-2,2-dimethylpropyl 5-(p-Methoxyphenyl)-2-furoate Hydrochloride

A. A mixture of p-anisidine (124 g, 1.01 mole) in $H_2O$ (100 ml) and concentrated HCl (270 ml) was diazotized by dropwise addition of $NaNO_2$ (72 g, 1.04 mole) in $H_2O$ (200 ml), with the pot temperature kept below 10°. Thirty minutes after completing the addition, the solution was filtered and added to furfural (123 g, 1.28 mole) in $H_2O$ (200 ml), followed by addition of cupric chloride dihydrate (46 g) in $H_2O$ (200 ml). The stirred mixture was heated at 56° for 4 hours and then stirred overnight at room temperature. The product was extracted with ether (1200 ml) in portions, washed with $H_2O$ (800 ml), and the ether extract was dried overnight over $MgSO_4$ and Darco. The solution was filtered and the filtrate stripped of solvent under reduced pressure yielding an oil, ca 75 g (37%).

B. A solution of $AgNO_3$ (98 g, 0.58 mole) in $H_2O$ (200 ml) was added to a solution of NaOH (45.5 g, 1.14 mole) in $H_2O$ (200 ml) with stirring. 5-(p-Methoxyphenyl)-2-furaldehyde (ca 75 g, 0.37 mole) was added in portions to the resulting brown, semi-solid mixture. The mixture was stirred for 20 minutes at room temperature, filtered and washed with hot water (400 ml). The filtrate was cooled in an ice bath, adjusted to pH 2, and the product was collected by filtration. The product was recrystallized from benzene, yield 26 g (32%). A sample was recrystallized from acetone, m.p. 172°–176°.

Anal. Calc. for $C_{12}H_{10}C_4$: C, 66.05; H, 4.62.
Found: C, 66.38; H, 4.56.

C. 5-(p-Methoxyphenyl)-2-furoic acid (24.4 g, 0.11 mole) was added with rapid stirring to thionyl chloride (42.5 ml), heated until solution occurred (about 5 min), and then refluxed for 3 hr. The mixture was stripped of excess thionyl chloride under reduced pressure, benzene (100 ml) was added, and the mixture was again stripped of solvent. The residue was treated with a solution of 3-diethylamino-2,2-dimethylpropanol (17.7 g, 0.11 mole) in benzene (600 ml), refluxed for 3 hr, cooled, diluted with petroleum ether (400 ml) and stored overnight at room temperature. The benzene petroleum ether solution was decanted, the residue dissolved in $H_2O$ (900 ml) and the solution adjusted to pH 8 with saturated aqueous $K_2CO_3$ (55 ml). The product was extracted from the aqueous phase with ether (1000 ml) in portions and the extract dried overnight over $MgSO_4$ and Darco. The solution was filtered and the filtrate adjusted to pH 2 with a mixture of dry HCl in ether (cooled in ice bath). Petroleum ether (500 ml) was added and the product oiled out of solution. The benzene-petroleum ether solution was decanted and the product was washed with anhydrous ether (scratching induced crystallization), yield: 19.8 g (46%). A sample was recrystallized from ethyl acetate, m.p. 133°–136°.

Anal. Calc. for $C_{21}H_{29}NO_4$: C, 63.70; H, 7.64; N, 3.54.
Found: C, 63.40; H, 7.65; N, 3.56.

EXAMPLE VII

3-Diethylamino-2, 2-dimethylpropyl 5-(p-Bromophenyl)-2-furoate Hydrochloride 2,2

5-(p-Bromophenyl)-2-furoic acid (25.4 g, 0.095 mole) was added with rapid stirring to thionyl chloride (31.5 ml) at room temperature, heated until solution occurred (about ½ hr.) and then refluxed for 3 hr. The mixture was stripped of excess thionyl chloride under reduced pressure, benzene (100 ml) was added, and the mixture was again stripped of solvent. The residue was treated with a solution of 3-diethylamino-2,2-dimethylpropanol (15.1 g, 0.095 mole) in benzene (400 ml), refluxed for 3 hr, cooled, diluted with petroleum ether (500 ml) and stored overnight at room temperature. The benzene-petroleum ether solution was decanted, the residue dissolved in H$_2$O (800 ml) and the solution adjusted to pH 8 with saturated aqueous Na$_2$CO$_3$ (50 ml). The product was extracted from the aqueous phase with benzene (900 ml) in portions and the extract dried overnight over MgSO$_4$ and Darco. The solution was filtered and the filtrate adjusted to pH 3 with a mixture of dry HCl in ether (cooled in ice bath). Petroleum ether (500 ml) was added and the product oiled out of solution. The benzene-petroleum ether solution was decanted and the product washed three times with anhydrous ether. The product was recrystallized twice from acetone, m.p. 154°–157°, yield: 10.7 g (25.5%).

Anal. Calc. for C$_{20}$H$_{28}$BrNO$_3$.HCl: C, 53.99; H, 6.12; N, 3.15.
Found: C, 54.16; H, 6.23; N, 301.

EXAMPLE VIII

3-Diethylamino-2,2-dimethylpropyl 5-(2,3-Dichlorophenyl)-2-furoate Hydrochloride A. A 5 l. three necked flask equipped with stirrer, thermometer and dropping funnel was charged with 2,3-dichloroaniline (289 g, 1.79 moles) and water (400 ml). Concentrated hydrochloric acid (900 ml) was introduced dropwise. The mixture was allowed to cool to room temperature. The content of the flask was cooled below −10°C in a dry ice-acetone mixture. A solution of sodium nitrite (115 g) in water (550 ml) was introduced dropwise at −10°C. The cooling bath was removed and the temperature allowed to rise to 0°C. A solution of 2-furoic acid (184 g, 1.64 moles) in acetone (660 ml) previously gravity filtered, was introduced with ice cooling. This was followed by a solution of cupric chloride dihydrate (40 g) in water (80 ml). The ice bath was removed and the flask was stored at room temperature for several days. The mixture was poured into water (ca 6 l.) in a 12 l. flask equipped with an air stirrer. After stirring for 2 hr the solid was filtered on a table Buchner, washed well with water, and dried at 60°C, yield: 275 g (65.0%). A portion of crude product (25 g) was dissolved in acetone (800 ml), filtered and the filtrate cooled overnight. The crystalline product was filtered and washed with ether; yield 15 g (60%). A sample was crystallized again from acetone, m.p. 259°–261°C.

Anal. Calc. for C$_{11}$H$_6$Cl$_2$O$_3$: C, 51.39; H, 2.35; Cl, 27.59.
Found: C, 51.36; H, 2.38; Cl, 27.32.

B. The product of A. (23.6 g, 0.09 mole) was added with rapid stirring to thionyl chloride (31.5 ml) at room temperature, heated until solution occurred (about 1 hr) and then refluxed for 3 ½ hr. The mixture was stripped of excess thionyl chloride under reduced pressure, benzene (100 ml) was added, and again stripped of solvent. The residue was treated with a solution of 32,22, -dimethylpropanol (14.5 g, 0.09 mole) in benzene (500 ml), refluxed 4 hr then stripped of solvent under reduced pressure. The residue was dissolved in isopropanol (600 ml) and cooled overnight. The product crystallized and was filtered and washed with cold isopropanol and ether; yield: 32.6 g (82%).

A sample was recrystallized twice from isopropanol, m.p. 168°–175°.

Anal. Calc. for C$_{20}$H$_{25}$Cl$_2$NO$_3$.HCl: C, 55.25; H, 6.03; N, 3.22.
Found: C, 55.06; H, 5.94; N, 3.13.

EXAMPLE IX

3-Dimethylamino-2,2-dimethylpropyl 5-(4-Methylphenyl)-2-furoate Hydrochloride

A. A 5 l. three necked flask equipped with stirrer, thermometer and dropping funnel was charged with 2-nitro-4-methylaniline (304 g, 2.0 mole) and water (400 ml). Concentrated hydrochloric acid (900 ml) was introduced slowly. When room temperature was reached the suspension was cooled below −10°C in a dry-ice-acetone mixture. A solution of sodium nitrite (140 g, 2.03 moles) in water (670 ml) was introduced dropwise maintaining the temperature below −10°C. The cooling bath was removed slowly and the temperature was allowed to come to 0°C. A solution of 2-furoic acid (224 g, 2.0 moles) in acetone (200 ml), previously gravity filtered, was added as fast as possible with ice cooling. Slight exothermicity (10°C) was observed. When the temperature had dropped to +5°C, a solution of cupric chloride dihydrate (40 g) in water (80 ml) was introduced. The ice bath was removed. The mixture was heated to 35° C with warm tap water. At this point the reaction became exothermic (50°C). When room temperature was reached the contents of the flask were poured into water (ca 6 l.) in a 12 l. flask equipped with an air stirrer. After decanting the water the red semi-solid was washed with fresh water by stirring and decanting. The semi-solid was taken up in acetone and the solvent was evaporated in an open dish. The residue weighed 371 g (75.2%). A portion of crude product (30 g) was washed in petroleum ether, filtered and dissolved in acetone (500 ml). The solution was filtered and cooled overnight. The crystalline product was filtered and washed with ether: yield: 13 g (43%). A sample was recrystallized again from acetone, m.p. 197°–200°.

Anal. Calc. for C$_{12}$H$_9$NO$_3$: C, 58.30; H, 3.67; N, 5.67.
Found: C, 58.04; H, 3.68; N, 5.59.

B. The product of A. (26.5 g, 0.11 mole) was added with rapid stirring to thionyl chloride (42.5 ml) at room temperature, heated until solution occurred (about ½ hr) and then refluxed for 3 hr. The mixture was stripped of excess thionyl chloride in vacuo, benzene (100 ml) was added, and again stripped of solvent. The residue was treated with a solution of 3-diethylamino-2,2-dimethylpropanol (17.7 g, 0.01 mole) in benzene (500 ml), refluxed for 4 hr, cooled, diluted with petroleum ether (500 ml) and stored overnight at room temperature. The benzene-petroleum ether solution was decanted, the residue dissolved in $H_2O$ (920 ml) and the solution adjusted to pH 8 with saturated aqueous $Na_2CO_3$ (60 ml). The product was extracted from aqueous phase with benzene (1000 ml) in portions and the extract dried overnight over $MgSO_4$ and Darco. The solution was filtered and the filtrate adjusted to pH 3 with ether-HCl (cooled in ice bath.) Petroleum ether (500 ml) was added and the product oiled out of solution. The benzene-petroleum ether solution was decanted and the product washed twice with anhydrous ether (scratching induced crystallization). The solid was recrystallized from isopropanol (400 ml); m.p. 146°–148°; yield 25.9 g. (58%).

Anal. Calc. for $C_{21}H_{28}N_2O_5 \cdot HCl$: C, 59.36; H, 6.88; N, 6.59.
Found : C, 59.39; H, 7.04; N, 6.49.

EXAMPLE X

3-Diethylamino-2,2-dimethylpropyl 5-(p-Chlorophenyl)-2-furoate Hydrochloride 5-(p-Chlorophenyl)-2-furoic acid (33.5 g, 0.15 mole) was added with rapid stirring to thionyl chloride (58 ml) at room temperature, heated until solution occurred (about 20 min) and then refluxed for 2 hr. The mixture was stripped of excess thionyl chloride under reduced pressure, benzene (100 ml) was added, and again stripped of solvent. The residue was treated with a solution of 3-diethylamino-2,2-dimethylpropanol (24.1 g, 0.15 mole) in benzene (700 ml), refluxed for 4 hr, cooled, diluted with petroleum ether (450 ml) and stored overnight at room temperature. The benzene-petroleum ether solution was decanted, the residue dissolved in $H_2O$ (1000 ml) and the solution adjusted to pH 8 with saturated aqueous $Na_2CO_3$ (70 ml). The product was extracted from the aqueous phase with benzene (1000 ml) in portions and the extract dried overnight over $MgSO_4$ and Darco. The solution was filtered and the filtrate adjusted to pH 3 with ether-HCl (cooled in ice bath). Petroleum ether (300 ml) was added and the product oiled out of solution. The benzene-petroleum ether solution was decanted and the product washed twice with anhydrous ether (scratching induced crystallization).

The solid was recrystallized from alcohol (200 ml); yield: 32 g. (53%) and further recrystallized from isopropanol, m.p. 139°–143°.

Anal. Calc. for $C_{20}H_{26}ClNO_3 \cdot HCl$: C, 60.00; H, 6.80; N, 3.50.
Found: C, 60.03; H, 6.84; N, 3.45.

What is claimed is:

1. A compound of the formula:

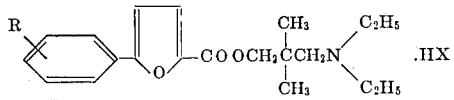

wherein R is a member of the group consisting of 4-nitro, 4-trifluoromethyl, 3,4-difluoro, 3-methoxy, 4-methyl, 4-methoxy, 4-bromo, 2,3-dichloro, 2-nitro-4-methyl, and 4-chloro, and HX is hydrochloride or fumarate.

2. The compound of claim 1 wherein R is 4-nitro.
3. The compound of claim 1 wherein R is 4-trifluoromethyl.
4. The compound of claim 1 wherein R is 3,4-difluoro.
5. The compound of claim 1 wherein R is 3-methoxy.
6. The compound of claim 1 wherein R is 4-methyl.
7. The compound of claim 1 wherein R is 4-methoxy.
8. The compound of claim 1 wherein R is 4-bromo.
9. The compound of claim 1 wherein R is 2,3-dichloro.
10. The compound of claim 1 wherein R is 2-nitro-4-methyl.
11. The compound of claim 1 wherein R is 4-chloro.

* * * * *